United States Patent [19]

Chang et al.

[11] Patent Number: 5,615,243
[45] Date of Patent: Mar. 25, 1997

[54] IDENTIFICATION OF SUSPICIOUS MASS REGIONS IN MAMMOGRAMS

[75] Inventors: Yuan-Hsiang Chang; David Gur; Bin Zheng, all of Pittsburgh, Pa.

[73] Assignee: University of Pittsburgh, Pittsburgh, Pa.

[21] Appl. No.: 614,363

[22] Filed: Mar. 12, 1996

[51] Int. Cl.$^6$ .......................................... A61B 6/12
[52] U.S. Cl. ................................. 378/37; 378/62
[58] Field of Search .............................. 378/37, 62, 98.5

[56] References Cited

U.S. PATENT DOCUMENTS

| | | | |
|---|---|---|---|
| 4,349,739 | 9/1982 | Annis | 378/98.5 |
| 5,142,557 | 8/1992 | Toker et al. | 378/37 |
| 5,365,429 | 11/1994 | Carman | 364/413.13 |

*Primary Examiner*—David P. Porta
*Assistant Examiner*—David Vernon Bruce
*Attorney, Agent, or Firm*—Cushman Darby & Cushman IP Group of PillsBury Madison & Sutro LLP

[57] ABSTRACT

A method of detecting and identifying abnormal regions in living tissue depicted in a digital radiograph includes, in each of a number of stages, identifying an abnormal region; and reducing any overlap between the identified regions. Typically the digital radiograph is a mammogram and the abnormal regions are suspicious mass regions in a human breast. Five stages of identifying are used to detect a region with a global minimum in the smoothed image; a region with a local minimum in the original image; a region with a local minimum in the filtered image; a small region of rounded shape and low contrast; and a region of rounded shape and high contrast.

7 Claims, 9 Drawing Sheets

FIG. 7
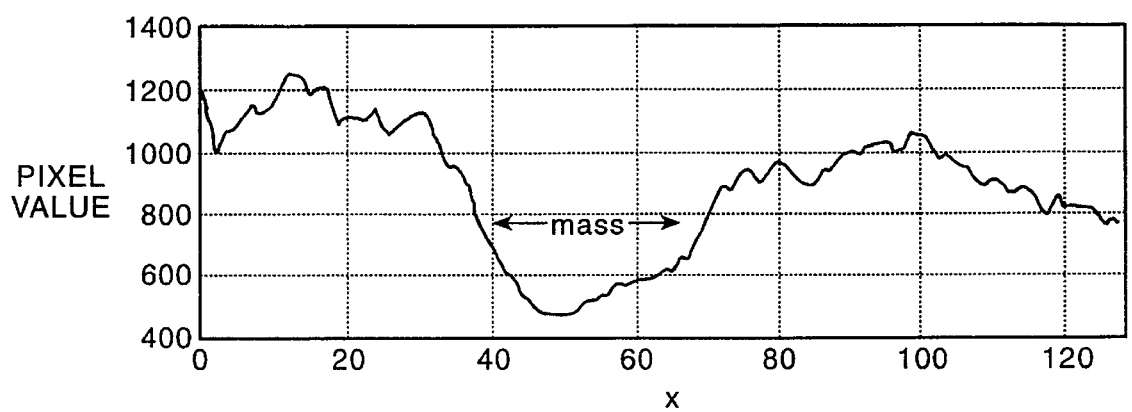
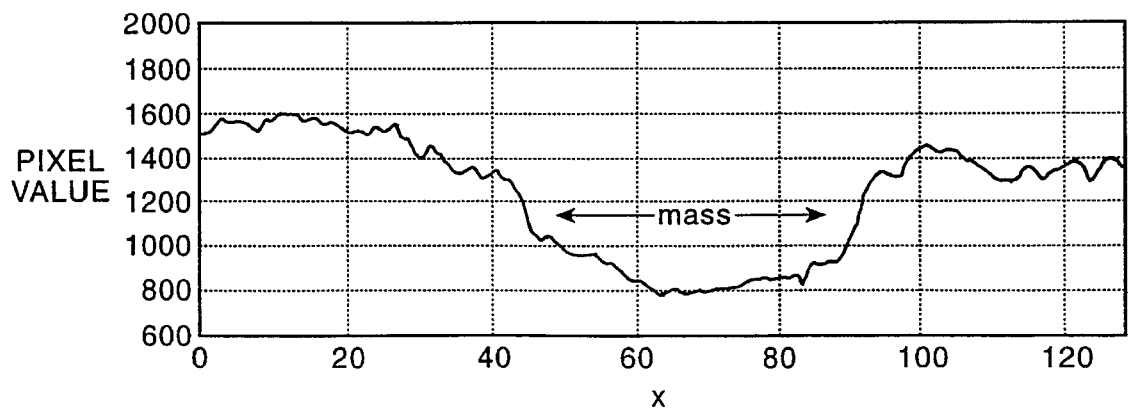

IDENTIFICATION OF SUSPICIOUS MASS REGIONS IN MAMMOGRAMS

FIELD OF THE INVENTION

This invention relates to computerized detection of abnormal anatomical regions depicted in radiographs.

BACKGROUND OF THE INVENTION

Identifying suspicious mass regions in digitized mammograms is a first step in computer-aided diagnosis (CAD) schemes. In mammographic mass detection, two general approaches to the problem have been explored, namely single-image segmentation and image subtraction of two similar views of the two contralateral breasts (bilateral image subtraction). The first approach involves a variety of image segmentation techniques and generally relies on image density patterns. The second approach uses bilateral subtraction of corresponding left-right matched image pairs and depends on asymmetry between density patterns of the two images. The need for accurate registration between the images for bilateral subtraction has been noted. In addition, bilateral subtraction is not applicable in cases where bilateral images appropriate for subtraction are unavailable for a variety of clinical reasons.

Success of these techniques typically is measured by the average number of false-positive regions found per image in order to detect a given percentage of true positive regions.

Current computerized detection schemes tend to segment a large number of suspicious regions in order to achieve the sensitivity required for clinical utility. Reducing the number of suspicious regions identified during the initial step of any CAD scheme is important to its ultimate performance.

SUMMARY OF THE INVENTION

This invention improves the initial identification performance in CAD schemes using a computerized scheme based on single-image segmentation. Unlike other single-image segmentation schemes that depend on local thresholding and typically result in a large initial number of suspicious regions, the present invention includes five distinct and relatively simple stages and identifies a maximum of five false-positive regions per image.

In one aspect, the five stages operate to detect (1) a region with a global minimum in the smoothed image; (2) a region with a local minimum in the original image; (3) a region with a local minimum in the filtered image; (4) a small region of "rounded" shape and low contrast; and (5) a small region of "rounded" shape and high contrast.

This invention provides a set of relatively simple processes which yield high sensitivity for mass detection while maintaining a relatively low false-positive rate.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which:

FIG. 7 shows typical pixel-value profiles of two masses found in digitized mammograms.

DETAILED DESCRIPTION OF THE PRESENTLY PREFERRED EXEMPLARY EMBODIMENTS

Figure 1:
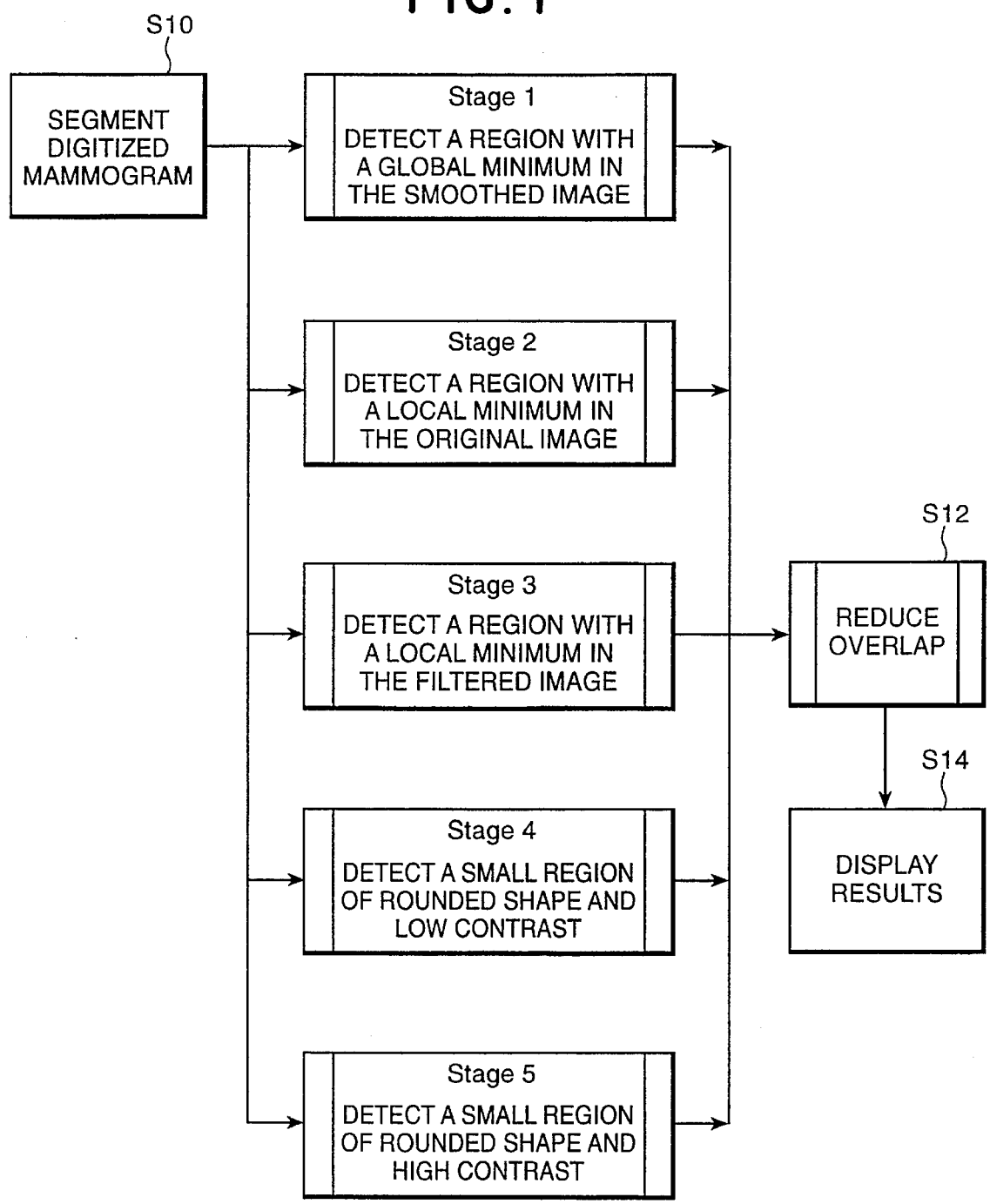
FIG. 1 is a flow chart of the computer-assisted detection scheme according to the present invention.

A flow chart of the five-stage detection scheme and mechanism according to the present invention is shown in FIG. 1. Given a digitized mammogram, the CAD scheme first applies breast segmentation (step S10), following which each of five rule-based identification steps are performed (stages 1–5). Each stage identifies at most one suspected region corresponding to a mass. It is possible that for some mammograms, in some stages, no region is identified. Hence, a total of at most five regions that may overlap (two or more detected regions merge to form a "connected" region) and may represent true or false identification are selected in the image. After each of the five stages has been performed, any overlap in the results is reduced (step S12) and then the results are displayed (step S14). Stages 1 to 5 can be performed sequentially or in parallel.

Known methods of performing the step of breast segmentation (step S10) can be used. For example, the segmentation method described in U.S. patent application Ser. No. 08/352, 169, "Computerized Detection of Masses and Microcalcifications in Digital Mammograms," to Gur et al, (hereinafter "Gur") which is hereby incorporated herein by reference, can be used. Some preferred embodiments use the segmentation scheme described in Good, W. F., et al, "Joint photographic experts group (JPEG) compatible data compression of mammograms," *J. Digit. Imaging*, 1994, Vol 7, pgs. 123–132.

After segmentation of the breast tissue (step S10), the following processes (stages) are applied to detect regions having the following characteristics:

(1) A global minimum of optical density in the smoothed image (in stage 1). This typically finds a suspicious region that is large and more dense as compared with the breast tissue.

(2) A local minimum of optical density in the original image (in stage 2). This typically finds a suspicious region not obscured by the surrounding breast tissue.

(3) A local minimum of optical density in a filtered image (in stage 3). This typically finds a suspicious region which is denser than and only partially obscured by the surrounding breast tissue.

(4) A small suspicious region of low contrast (in stage 4); and (5) a small suspicious region of high contrast (in stage 5). Stages 4 and 5 each typically find a suspicious region that is of small size, having a "rounded" shape with either low or high contrast.

At each stage the following features or factors are considered for each region: longest axis, size, shape factor, number of holes and convexity (concavity). These factors are defined in more detail below. At each stage, regions with concave shape and those having many holes contained within their boundaries also are taken into account.

The following specific criteria were selected empirically based on measured characteristics' distribution in a rulebase optimization data set (described below) and are applied at each stage.

In each of the first three stages, the detected regions are divided into three size categories:

(1) smaller than 200 pixels;

(2) between 200 and 3000 pixels; and (3) larger than 3000 pixels.

In preferred embodiments pixel size is 0.4×0.4 mm$^2$.

If a region is smaller than 200 pixels, it is considered too small and is deleted. If a region is between 200 and 3000 pixels, the shape factor of that region ($S_f$) has to be larger than 0.2, otherwise that region is deleted. If a detected region is larger than 3000 pixels, different processes (to check for convexity and hole detection) are performed. That is, the detected region has to be of convex shape and the number of holes ($N_{hole}$) inside the region has to be smaller than three (3).

Finally, in the last two stages of the scheme (i.e., small mass detection with either low or high contrast), different criteria for size and shape factors are applied:

(1) the size (S) of the detected region has to be in the range 100<S<450 pixels;

(2) the length (L) of the longest axis had to be in the range 10<L<50 pixels; and (3) the shape factor ($S_f$) of the region has to satisfy $S_f$>0.3.

Determining Feature Factors

As noted above, denote the set of pixels in a region by R and its corresponding background by R'. In binary images, every pixel in the region has a value of binary one (1), while every pixel in the background R' has a value of binary zero (0). The size S of the Eegion R is defined by:

$$S = \sum_{(r, c) \in R} 1$$

where (r, c) represent a coordinate point in the region. The centroid ($\bar{r}, \bar{c}$) of the region is defined by:

$$\bar{r} = \frac{1}{S} \sum_{(r, c) \in R} r, \bar{c} = \frac{1}{S} \sum_{(r, c) \in R} c$$

Following the notation of Haralick and Shapiro, Computer and Robot Vision, Vol. I, Reading, Mass, Addision-Wesley Publishing Company, Inc., 1992, pp. 28–62, the 8-connected perimeter of the region R is defined as:

$$P_8\{(r,c) \in R | N_4(r,c) - R \neq 0\}$$

where $N_4(r,c)$ is a 4-connected neighbor operator. That is, the 8-connected perimeter $P_8$ is the set of pixels in the region R that is 4-adjacent to a 0. Then, the length L of the longest axis of the region is derived by:

$$L = \{\max \sqrt{(r_1 - r_2)^2 + (c_1 - c_2)^2} \quad |(r_1, c_1), (r_2, c_2) \in P_8\}$$

If the equation of the longest axis is defined as Ar+Bc+C=0 for some coefficients A, B and C, then the maximum distance D from the perimeter of a region to the longest axis is:

$$D = \left\{ \max \frac{Ar + Bc + C}{\sqrt{A^2 + B^2}} \quad |(r, c) \in P_8\right\}$$

Finally, define the shape factor $S_f$ as:

$$S_f = D/L$$

If the region is elongated, the distance D is small whereas the length L of the longest axis is large, resulting in a small shape factor $S_f$. Note that the shape factor ($S_f$) is size-independent.

To determine if a region has a convex or concave shape, check if the centroid ($\bar{r}, \bar{c}$) $\in R$, where R is the set of pixels in a region and R' is its corresponding background.

The process of detecting the number of holes inside the region include the following steps:

(1) open a region of interest that is slightly larger than the bounding rectangle of the detected region (in binary images, black objects represent the regions whereas white objects represent their corresponding background);

(2) then invert the region of interest so that all black subregions correspond to either background region or holes;

(3) implement connected component labeling on the resulting region of interest and compute the total number of connected components. (This technique of grouping the binary one pixels into maximal connected regions is described in Haralick and Shapiro.)

(4) The final number of holes inside the region R ($N_{holes}$) is the total number of "connected" components minus one.

The Data Sets

The rule-based image set used to determine various criteria for the processing stages contains a total of 260 cases which, with the exception of 10 cases, each involve two bilateral digitized mammogram of the same view (i.e., either left and right craniocaudal or mediolateral oblique).

The wide distribution of mass characteristics and background variabilities in our image data base resulted in a range of mass conspicuities and were rated subjectively by radiologists from "obvious" (<20%) to "subtle" or "very subtle" (>30%).

The 510 images in the database were divided randomly into two image sets:

1) a rule-based optimization set that included 250 images (80 images with true-positive masses); and 2) a test set that included 260 images (82 images with true-positive masses).

Characteristics of Mass Regions

The masses included in the test data base varied in size, contrast, appearance, and conspicuity. Pixel-value profiles of two of the more visible masses in our data base are shown in FIG. 7. It can be seen that the pixels that lie within the masses generally have lower pixel values (i.e., appear as denser tissue) than those of surrounding breast tissue, and these masses typically include a local minimum of pixel value in the digitized mammogram. In this study, a five-stage rule-based detection scheme was designed to detect the masses that satisfy at least one of the following four characteristics.

(1) The mass is large and very dense as compared with the breast tissue;

(2) The mass is not obscured by the surrounding breast tissue;

(3) The mass is denser than and only partially obscured by the surrounding breast tissue; and (4) The mass is of small size, having a rounded shape with either low or high contrast.

These general characteristics were used to develop the following five-stage detection scheme.

Stage I: Detection of A Region with A Global Minimum of Optical Density in the Smoothed Image Because a large and generally well-defined mass often appears as the densest area in the breast image, one criterion to locate the possible position of such a mass is to detect a global minimum of optical density in the image.

Figure 2:
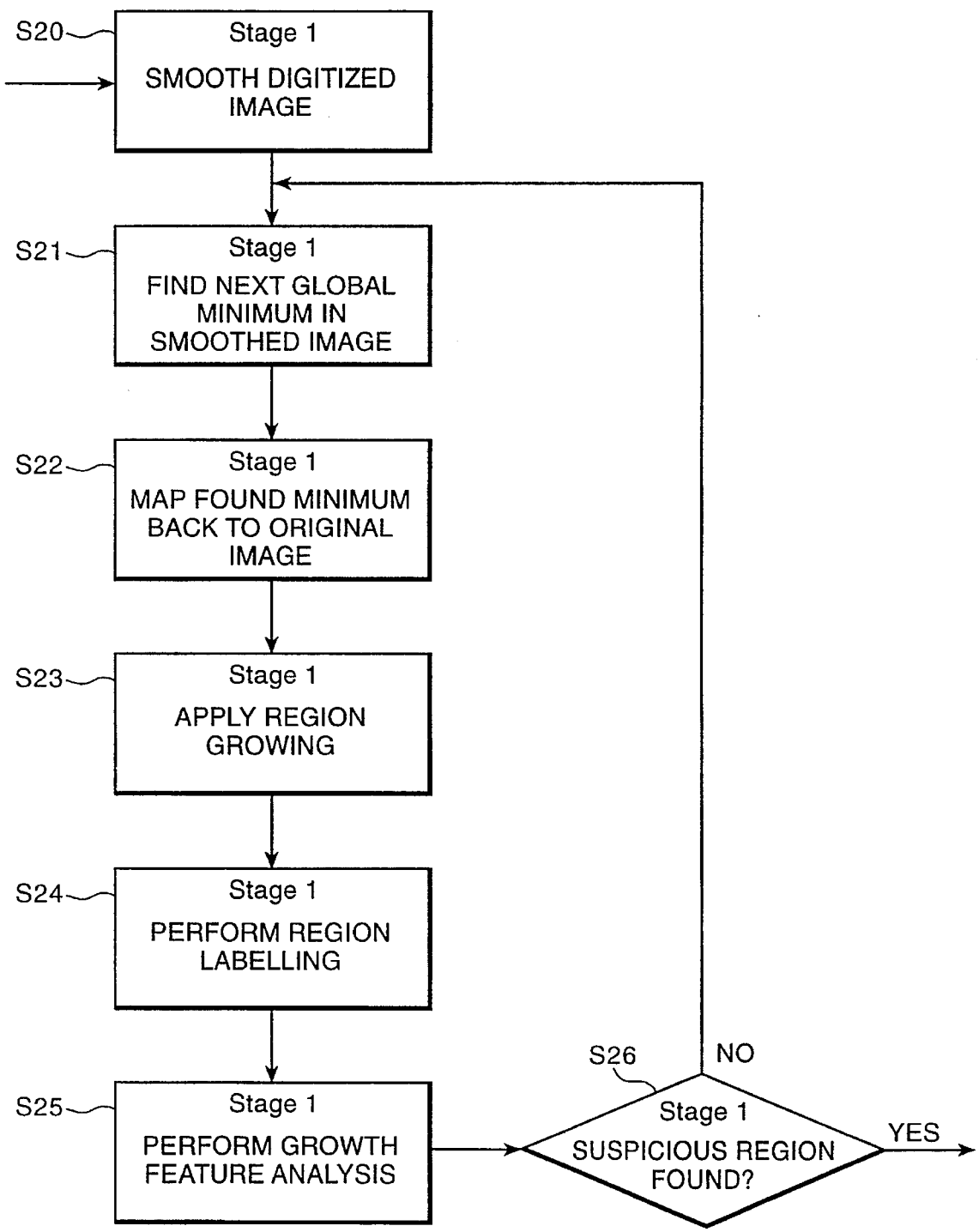
FIGS. 2–6 depict flow charts of stages 1–5, respectively, of the CAD scheme shown in FIG. 1.

Operation of Stage 1 is described with reference to the flow chart in FIG. 2. The object of this stage is to identify obvious mass regions without detecting artifacts or noise that also may be present at regions with a low optical density (i.e., a high relative exposure).

To do so, first the image is smoothed (step S20) by a Gaussian low-pass filter with a kernel size of thirteen (13) pixels. The CAD scheme then searches for the global minimum of optical density (the point with the lowest pixel value) in the smoothed image (step S21). The location of this point (pixel location) is mapped back to the original image and is defined as the starting pixel for a region growing routine (step S22). Next a region growing routine is applied (step S23) and region labeling is performed (step S24).

The region growing routine used is as follows. Given an initial growth pixel $(\hat{r}, \hat{c})$ and a fixed threshold T, all neighboring pixels of an existing region whose pixel values are lower than or equal to the threshold T are joined as a new connected set of pixels (i.e., a new region) for the next iteration. The iterations terminate when no neighboring pixel of an existing region satisfies the criterion. In preferred embodiments, for the region growth algorithm, the threshold T was chosen as $$T = I(\hat{r}, \hat{c}) + I(\hat{r}, \hat{c}) \times CONT$$

where $(\hat{r}, \hat{c})$ are the coordinates of the global minimum and $I(\hat{r}, \hat{c})$ is the corresponding pixel value. The value of contrast (CONT) was chosen at 25% based on the contrast value distributed of the masses in the rule-based optimization set so as to estimate an initial shape of the selected region. Such a contrast value remained invariant in the test set. Note that the value T may vary with respect to the pixel value of the global minimum.

Note that region labeling (step S24) and growth feature analysis (step S25) are performed on the original rather than the smoothed image.

Two feature criteria of size and shape factor are used to reject very small or extremely elongated regions (the definition of the shape factor and the limitation on the elongated region are addressed below). If the selected region fails these simple criteria (step S26), the second lowest point in the smoothed image is located and the procedure is repeated. This process terminates when one suspicious region is selected (passes the feature criteria) or the process has been repeated five times (i.e., five regions fail to pass the criteria).

Figure 3:
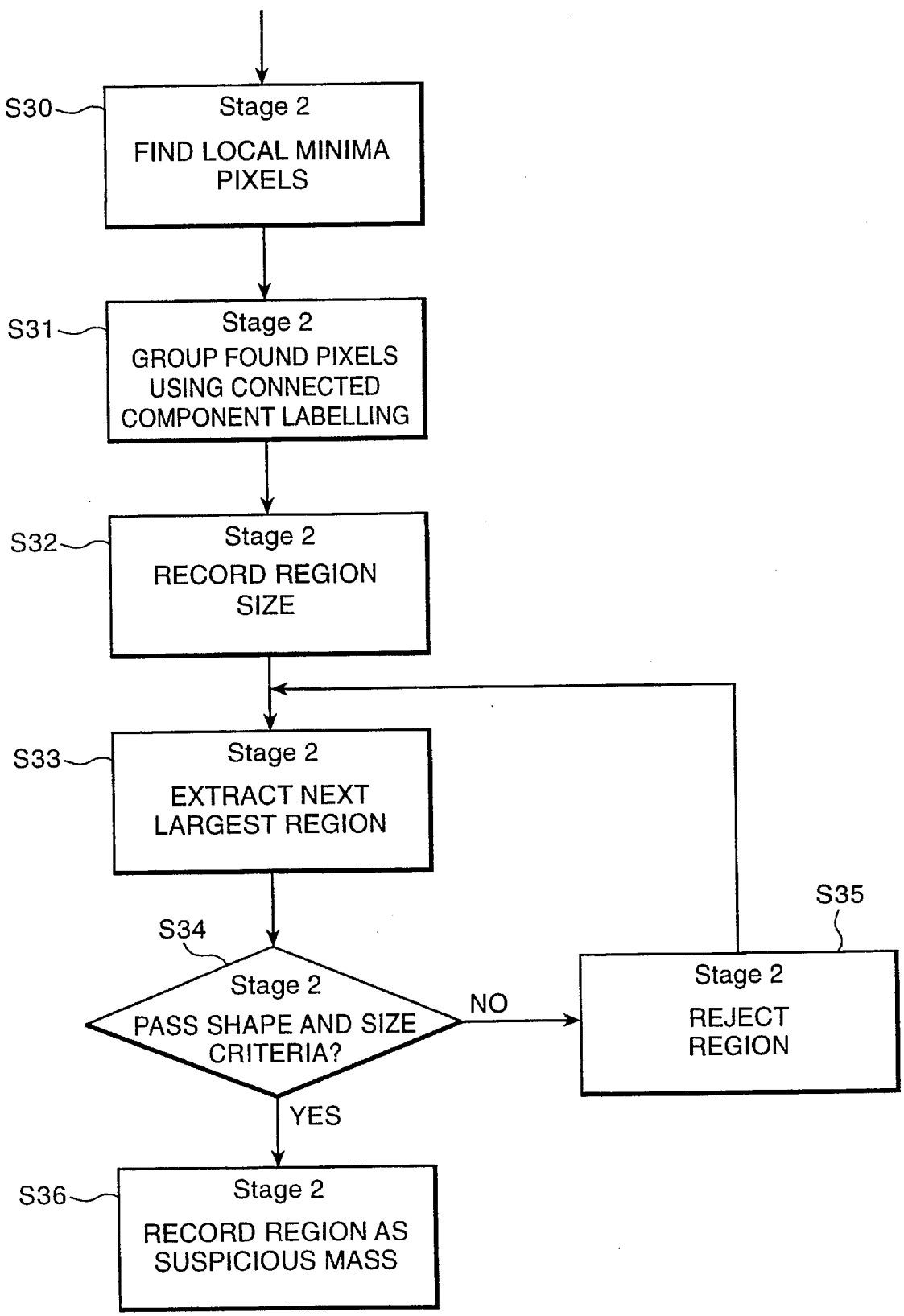

Stage 2: Detection of A Region with A local Minimum of Optical Density in the Original Image The operation of Stage 2 is described here with reference to the flow chart in FIG. 3.

Despite the fact that a large fraction of masses (about 50% of cases in the image set used to test the present embodiment) can be selected through a global minimum of optical density search, many additional masses demonstrate strong characteristics of a local minimum of optical density. Thus, the target of this stage is a mass that is denser than its surrounding breast tissue but does not appear as the densest area in the image. Because there are generally a large number of local minima pixels in an image, a special detection algorithm was designed to classify which of these most likely represent a local minimum within a true-positive mass region. Define a ring-like operator, $\Omega$ as $$\Omega = \{(x, y) | d \leq \sqrt{x^2 + y^2} < d + \Delta d\}$$

where d and d+$\Delta$d are the minimum and maximum radii in pixels of the ring-like operator and $\Delta d > 0$. That is, $\Omega$ is the set of points or pixels (x, y) such that $\sqrt{x^2+y^2}$ is greater than or equal to d and less than d+$\Delta$d. The selected radius of the ring-like operator has to be large enough to contain both the mass and its background. The values of d=30 pixels and $\Delta d$=0.2 were chosen empirically. Then, the set of local minima, $\Lambda$, in a digitized mammogram, I, is the set of points or pixels (r, c) defined by:

$$\Lambda = \{(r, c) \epsilon I | \min I(r+x, c+y) > I(r, c), (x, y) \epsilon \Omega\}$$

That is, for each pixel (r, c) in the image I, a set of neighbors in the surrounding ring is compared. If the pixel value of the central pixel is less than those of the surrounding ring, the pixel is identified as a local minimum (step S30). All pixels so identified are then grouped into connected regions using connected component labeling (step S31) and the size of the labeled regions is recorded (step S32).

A large number of empirical experiments demonstrated that when a suspicious mass region indicates a true-positive mass, it is typically larger than other false-positive mass regions. Therefore, after labeling all suspicious regions containing local minima in the image, the largest one is extracted as a potential mass (step S33). Inside this largest region, a pixel with the lowest pixel value is chosen as an initial growth pixel for the region growing routine as described previously in the identification of a region with a global minimum. Here, the threshold for the growth was set at 10% contrast. The reason for using a relatively low contrast value (10%) during this stage is to identify potential mass regions that are not as obvious as those detected in the first stage. A mass with a well-defined local-minimum property is likely to be detected during this stage even if it is located near the skin boundary, because pixel values outside the skin boundary (or part of the ring) generally are higher than those inside the skin boundary.

Once the largest region is extracted (step S33), the system determines whether or not the region passes the shape and size criteria (described above). If the region passes the criteria, it is recorded as a suspicious region (step S36), otherwise the region is rejected (step S35) and the process is repeated (from step S33) until a suspicious region is found or a predetermined number of regions (preferably five) have been tested.

Figure 4:
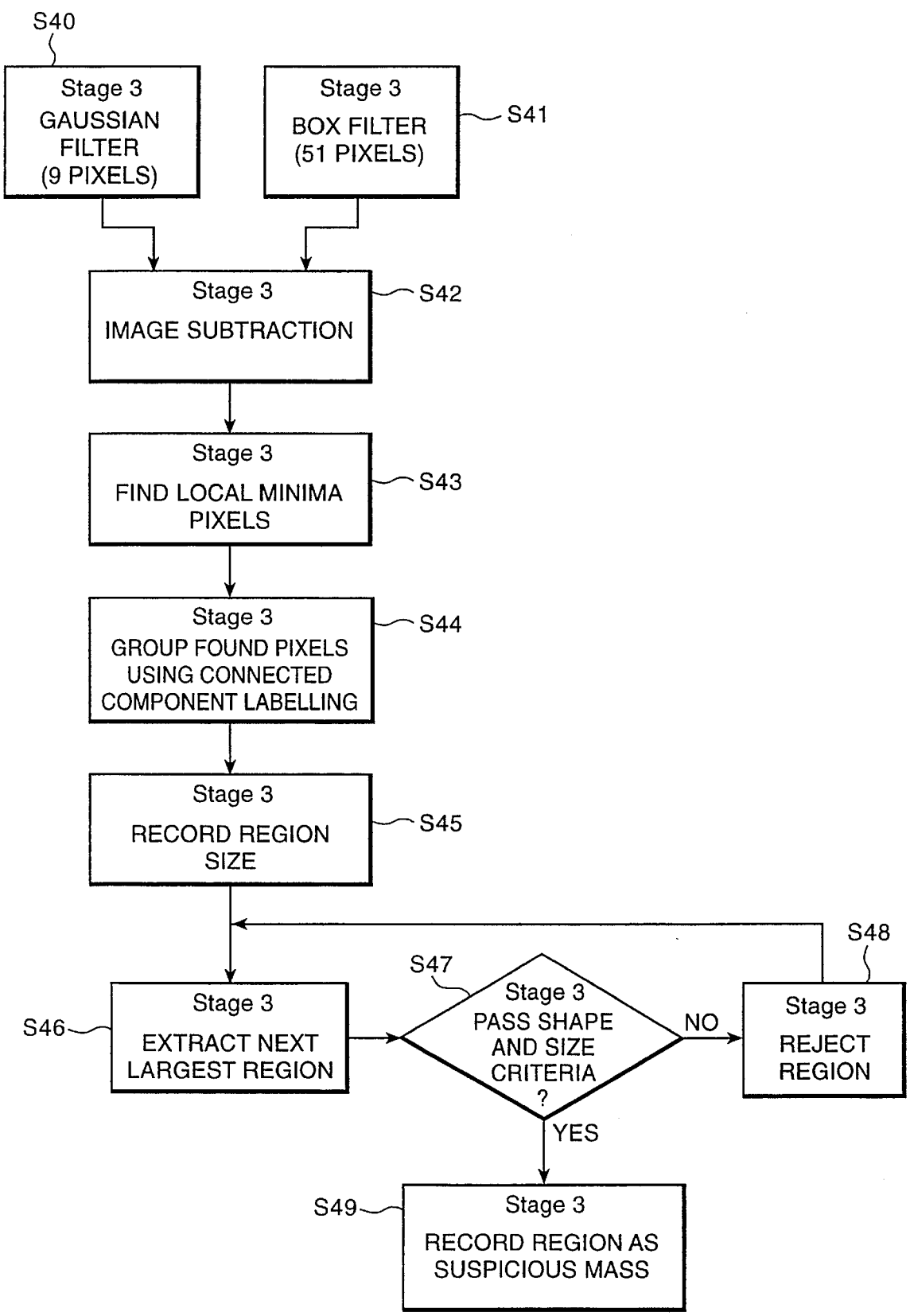

Stage 3: Detection of a Region with A Local Minimum of Optical Density in the Filtered Image A mass may be denser than its surrounding breast tissue but can be partially obscured. Detection of such a mass (in Stage 3) is described with reference to the flow chart in FIG. 4.

First, the original digitized mammogram is filtered using a Gaussian filter of size nine (9) pixels and a box filter of size fifty one (51) pixels (steps S40, S41), thereby producing two filtered images. These two images are the subtracted (step S42) to produce a filtered image.

The subtraction process serves two main functions: it enhances the contrast of the mass itself and it removes underlying background that may obscure the local minimum property of the mass.

The Gaussian filtered image is used to estimate the initial shape of the masses, whereas the box filtered image is used to estimate the surrounding background. The box filter was selected because with a large kernel size it performs faster than a Gaussian filter with a large kernel size.

Having produced the subtracted image, local minima pixels are found (step S43) and these found pixels are grouped using connected component labelling (step S44). The size of the region is recorded (step S45) and then the largest region is extracted (step S46).

The extracted largest region is then subjected to the shape and size criteria (step S47). If it fails these criteria, the region is rejected (step S48), otherwise it is recorded as a suspicious mass (step S49).

In other words, the region with the largest size and that passes the feature selection criteria is identified as a suspicious region.

As with stage 2, if the region is rejected (step S48), the process is repeated (from step S46) until a suspicious region is found or a predetermined number of regions (preferably five) have been tested.

Figure 5:
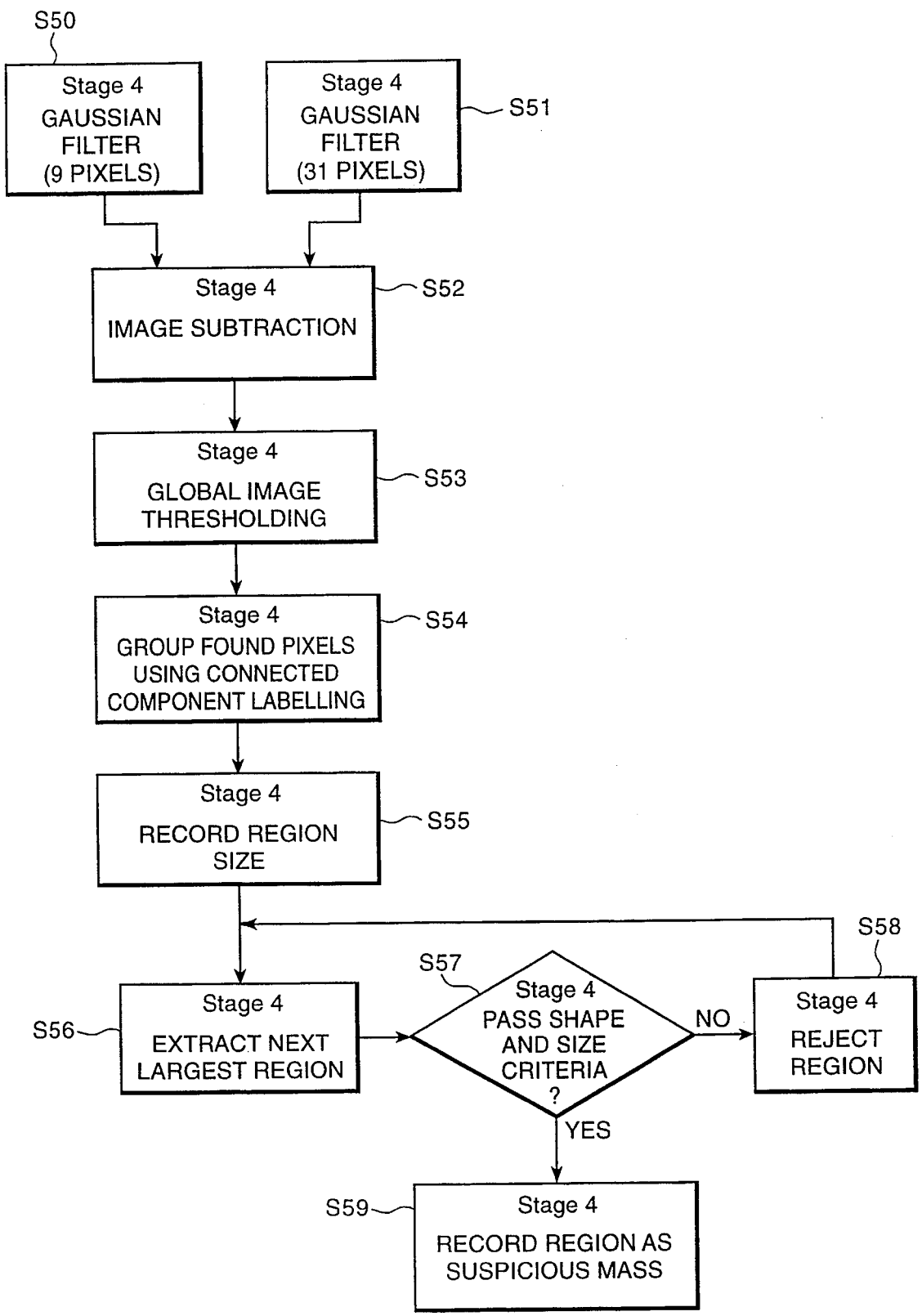
Figure 6:
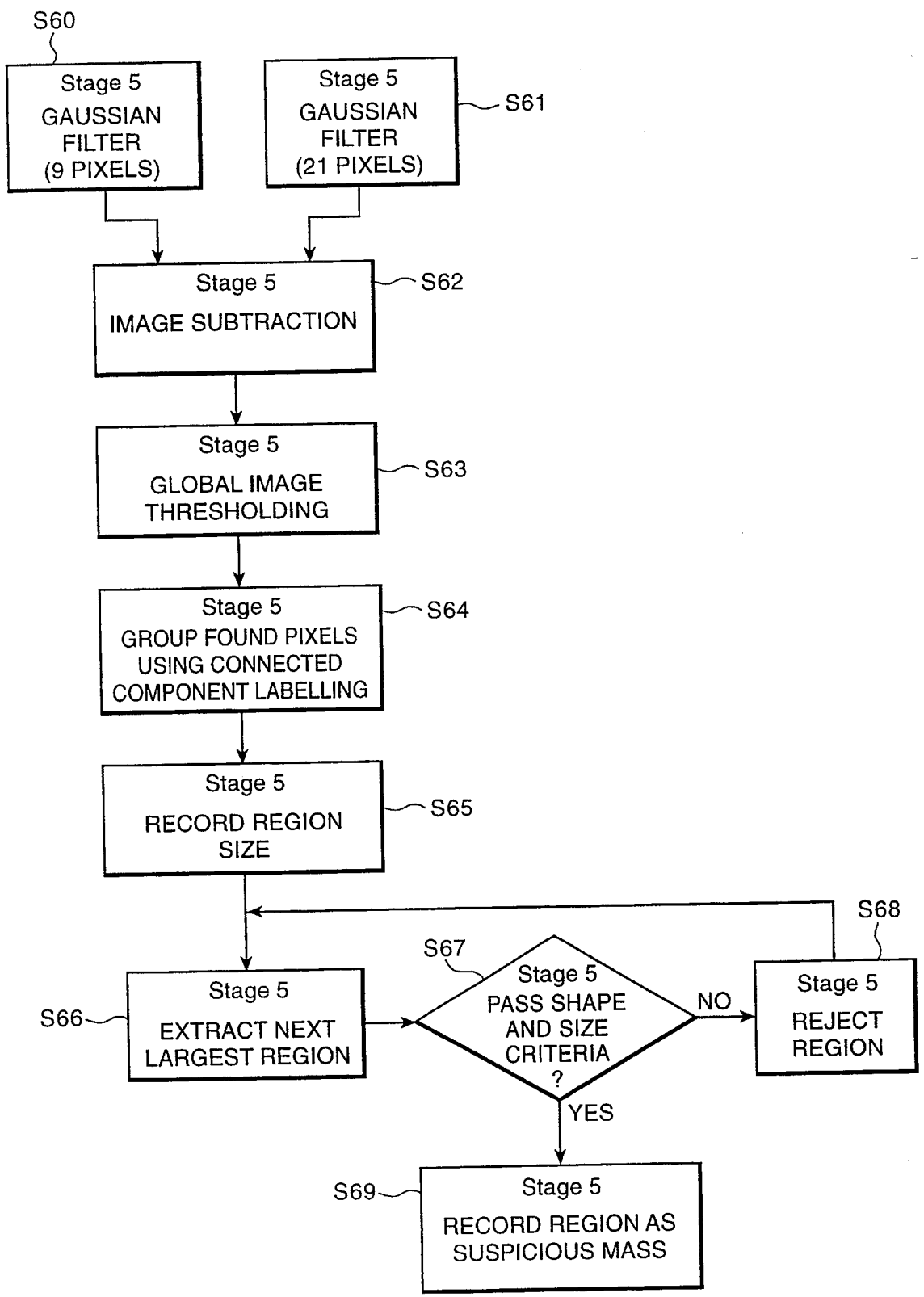

Stages 4 & 5: Detection of Two Regions with Small "Rounded" Masses of Low and High Contrast Operation of this stage is described here with reference to the flow charts depicted in FIGS. 5 and 6.

Small masses may have either low or high contrast. The purpose of stages 4 and 5 is to extract two such regions, one of low contrast and one of high contrast, which may be missed in the first three stages. The kernel sizes of the filters are different in the detection of low-and high-contrast masses from the previously-described stage 3, because the contrast of a small mass may not be enhanced properly using a large kernel (i.e., fifty one (51) pixels). Therefore, different filters were selected. The first filter used in both cases was a Gaussian filter with a kernel size of 9 pixels (steps S50, S60). The second set of filters were the box filter with kernel sizes of thirty one (31) pixels (step S51) and twenty one (21) pixels (step S61) for the small masses with low and high contrast, respectively. Two different kernel sizes were selected to provide a variety of enhancement characteristics for improved detection.

Having filtered the original digitized image (steps S50, S51 and S60, S61), the images are then subtracted (steps S52, S62) and the resulting images are then subjected to image thresholding (steps S53, S63).

Two global threshold values were empirically selected in the filtered image at 100 and 200 digital values to extract the suspicious region with low (stage 4) and high (stage 5) contrast, respectively.

The found pixels are then grouped using connected component labelling (steps S54, S64), the region size is recorded (steps S55, S65) and then the largest region is extracted (steps S56, S66).

The largest region is subjected to shape and size criteria (steps S57, S67). If the region fails these criteria then the region is rejected (steps S58, S68), otherwise it is recorded as a suspicious mass (steps S59, S69).

If the region is rejected, the process is repeated (from steps S56, S66) until a suspicious region is found or a predetermined number of regions (preferably five) have been tested.

EXAMPLE

To demonstrate this scheme's performance and effectiveness in identifying suspicious true-positive mass regions (including both malignant and benign masses) at each stage, 510 images were tested. TABLE I below summarizes the detection results of suspicious regions for masses in both the rule-based optimization set and the test set. In this example, stages 2, 3, 4 and 5 were not repeated after initial failure.

TABLE I

Detection results of Suspicious Regions for Masses in the Database

| | Rule-Based Optimization Set | Test Set |
|---|---|---|
| Radiographically and pathologically verified masses | 80 | 82 |
| Detected Masses | 77 | 77 |
| True-positive detection sensitivity | 96% | 94% |
| Total Images | 250 | 260 |
| Detected false-positive masses | 412 | 470 |
| False-positive detection rate (number/image) | 1.6 | 1.8 |

Figure 8:
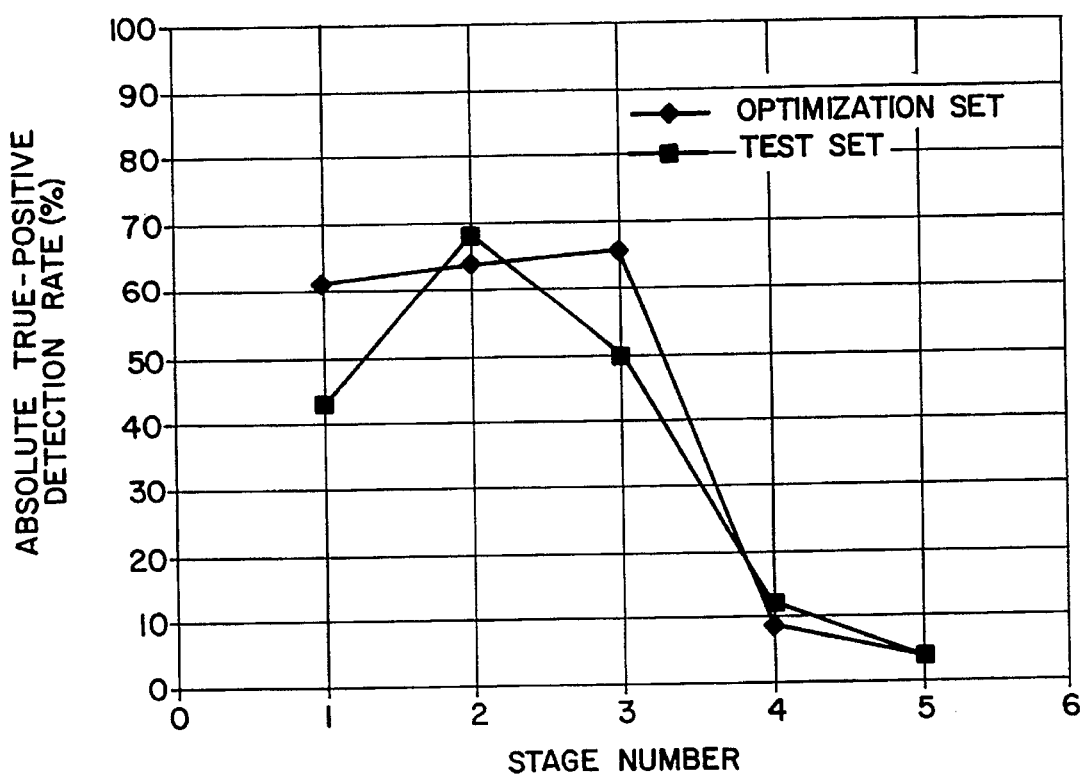
FIGS. 8–11 show various experimental results of using the invention shown in FIG. 1.
Figure 9:
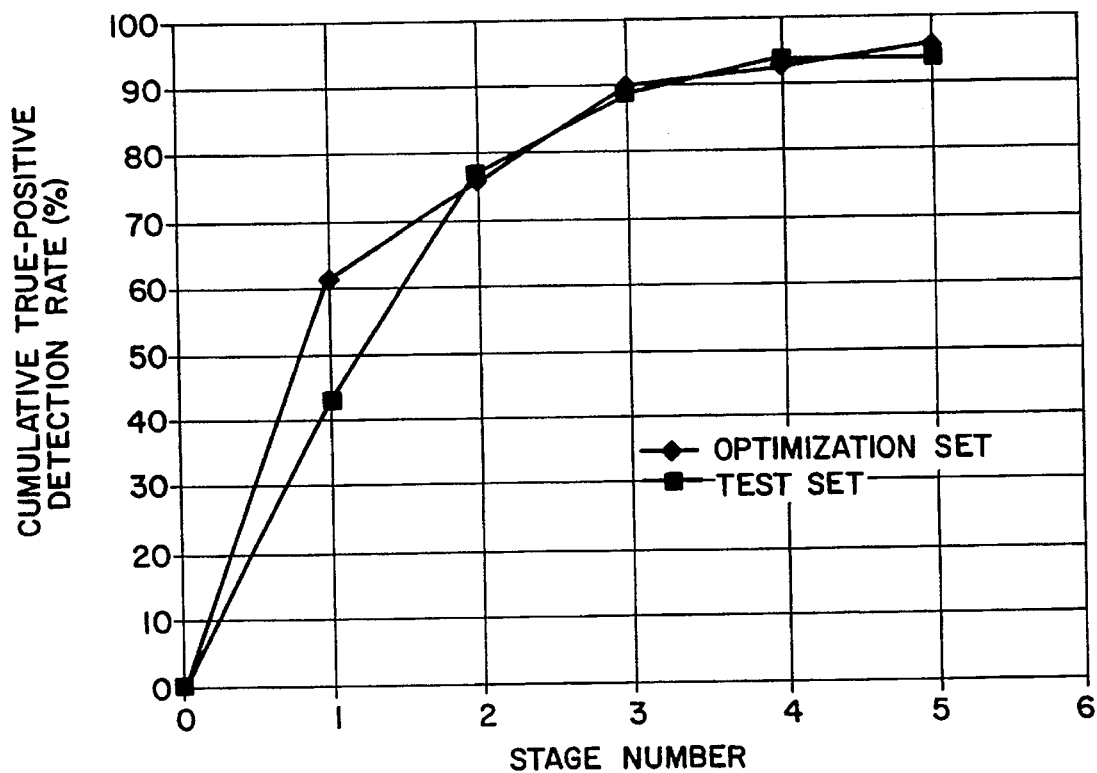

On the average, the system identified 1.7 false-positive regions per image, whereas successfully detecting 95% of the true-positive regions. FIG. 8 shows the sensitivity of each stage of the scheme. For the rule-based optimization set, the first stage has a sensitivity of 61%, whereas the second and third stages have 64% and 66% sensitivity, respectively. During testing, the first stage exhibited sensitivity of 43%, whereas the second and third stages exhibit sensitivities of 68% and 50%, respectively. Note that these results vary with the characteristics' distribution in the image data base. FIG. 9 shows the cumulative detection rate of the true-positive masses in the data base, which is a more important parameter to evaluate than the sensitivity of each step in the detection scheme. Because different regions are detected at different stages, the detection scheme can achieve a cumulative detection rate close to 90% with the first three stages alone. Most of the true-positive masses missed at this point are small, and the last two stages were designed specifically to increase the true positive detection rate to 95% (FIG. 9).

Figure 10:
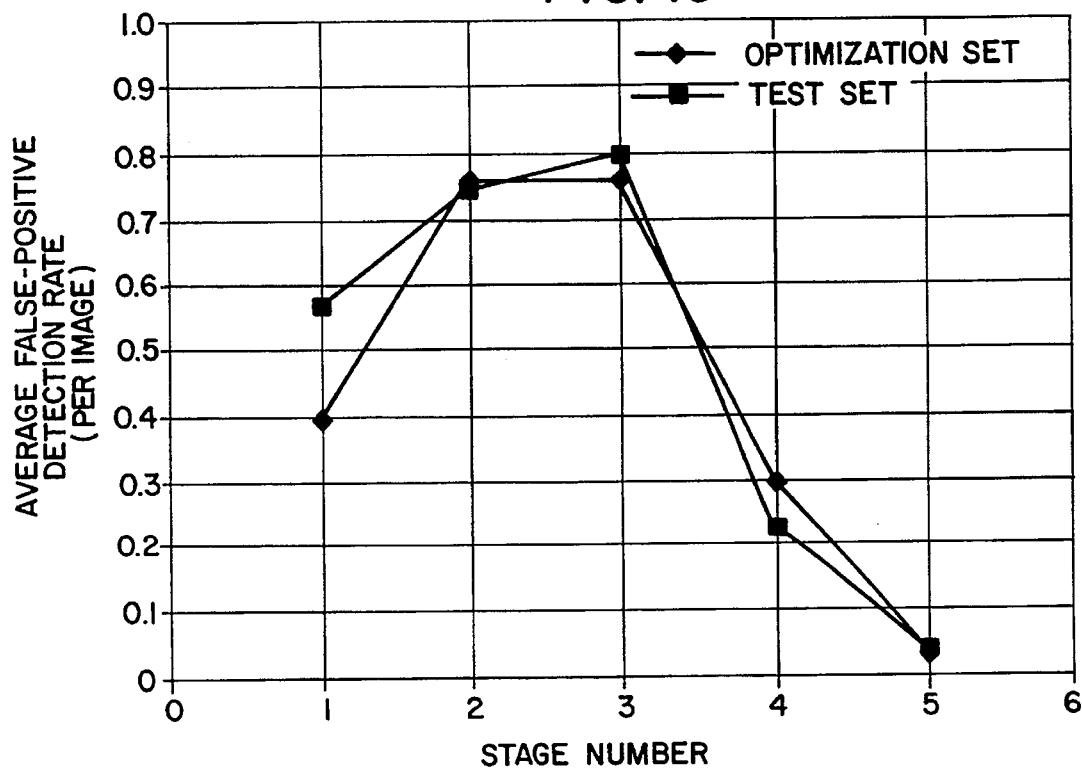
Figure 11:
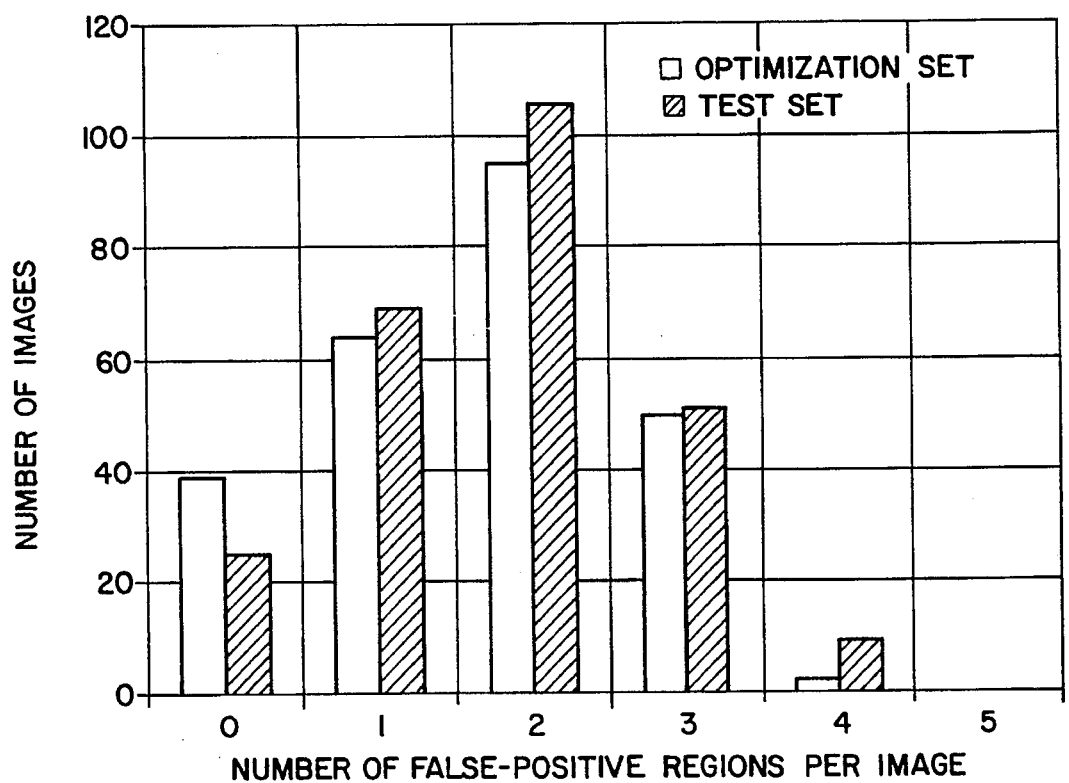

As important, because two or more selected regions from different stages may overlap, they represent the same mass and the number of actually detected false-positive regions has been reduced significantly from the possible maximum of five per image. FIG. 10 shows the average number of false-positive detections of each stage. Note that this number is lower than 1.0 per image because of shape and size boundary conditions. The final false-positive detection rate in the test set has been reduced further to about 1.8 per image because of the overlap reduction among stages. FIG. 11 shows the distributions of the number of false-positive mass regions per image for the two image sets. As can be seen, most images have less than three false-positive regions identified.

Using a multi-stage process, a computerized scheme to identify suspicious regions for masses in digitized mammogram was demonstrated. The method was developed based on measured characteristics of masses in a large number of mammogram and was tested on a set of clinical mammogram with reasonable success. Within the range of sensitivities of interest (>90%), the technique produced a small number (average<2) of false-positive regions per image in our data base, albeit the number of images with no false-positive regions was relatively small (FIG. 11).

Note that stages 4 and 5 contribute only a small fraction of the true-positive regions identified by this scheme. The main reason for including these two stages stem from the necessity to identify small masses, despite of the cost of increasing the false-positive detection rates.

The scheme presented here is typically a first step to select suspicious mass regions in traditional CAD schemes, however it also performs well as a stand-alone system.

Thus, a system for identification of suspicious mass regions in mammograms is provided. One skilled in the art will appreciate that the present invention can be practiced by other than the described embodiments, which are presented for purposes of illustration and not limitation, and the present invention is limited only by the claims that follow.

What is claimed:

1. A method of detecting and identifying abnormal regions in living tissue depicted in a radiograph, the method comprising the steps of:

in said radiograph, attempting to identify one region of interest corresponding to each of a plurality of characteristics of interest; and reducing overlap between said identified regions of interest to identify abnormal regions depicted in the radiograph.

2. A method as in claim 1, wherein said radiograph is a mammogram.

3. A method as in claim 2, wherein said abnormal regions are suspicious mass regions in a human breast.

4. A method as in claim 3, wherein said plurality of characteristics of interest include at least one of:

(a) characteristics for detecting a mass region that is large and very dense as compared with surrounding breast tissue;

(b) characteristics for detecting a mass which is not obscured by surrounding breast tissue;

(c) characteristics for detecting a mass that is denser than and only partially obscured by surrounding breast tissue;

(d) characteristics for detecting a mass which is of small size, having a rounded shape with low contrast; and (e) characteristics for detecting a mass which is of small size, having a rounded shape with high contrast.

5. A method as in claim 3, wherein said step of attempting to identify comprises the steps of:

detecting a region with a global minimum in the smoothed image;

detecting a region with a local minimum in the original image;

detecting a region with a local minimum in the filtered image;

detecting a small region of rounded shape and low contrast; and detecting a region of rounded shape and high contrast.

6. A method as in claim 1 wherein said method attempts to identify at most one region of interest corresponding to each of the plurality of characteristics of interest.

7. A method of detecting abnormal regions in living tissue depicted in a radiograph, the method comprising the steps of:

identifying a predetermined plurality of characteristics of interest;

in said radiograph, attempting to identify one region of interest corresponding to each of said plurality of characteristics of interest;

reducing overlap between said identified regions of interest to produce regions corresponding to abnormal regions depicted in the radiograph.

* * * * *